United States Patent [19]

Kobayashi et al.

[11] Patent Number: 5,076,209

[45] Date of Patent: Dec. 31, 1991

[54] BREEDING APPARATUS

[75] Inventors: Toshiaki Kobayashi; Hatsuo Yotsumoto, both of Amagasaki; Tateki Ozawa; Toshihiko Sasaki, both of Kobe; Shigeki Nakayama, Amagasaki, all of Japan

[73] Assignee: Mitsubishi Denki Kabushiki Kaisha, Tokyo, Japan

[21] Appl. No.: 610,564

[22] Filed: Nov. 8, 1990

[30] Foreign Application Priority Data

| Nov. 29, 1989 | [JP] | Japan | 1-311277 |
| Nov. 29, 1989 | [JP] | Japan | 1-311278 |
| Nov. 29, 1989 | [JP] | Japan | 1-311279 |
| Jul. 4, 1990 | [JP] | Japan | 2-176773 |

[51] Int. Cl.$^5$ .............................. A01K 61/00
[52] U.S. Cl. ............................................ 119/3
[58] Field of Search ............................ 119/3, 4, 5

[56] References Cited

U.S. PATENT DOCUMENTS

| 3,661,262 | 5/1972 | Sanders | 119/3 X |
| 4,034,030 | 7/1977 | Bracey | 119/3 X |
| 4,044,720 | 8/1977 | Fast | 119/3 |
| 4,052,960 | 10/1977 | Birkbeck et al. | 119/3 |
| 4,076,619 | 2/1978 | Howery | 119/5 X |
| 4,101,608 | 7/1978 | Bracey | 119/3 X |
| 4,182,267 | 1/1980 | Kominami et al. | 119/3 |
| 4,202,291 | 5/1980 | Kominami et al. | 119/3 |
| 4,469,048 | 9/1984 | Dugan et al. | |
| 4,517,084 | 5/1985 | Pincon | 119/3 X |
| 4,532,883 | 8/1985 | Lockwood et al. | 119/4 |

FOREIGN PATENT DOCUMENTS

| 1288395 | 11/1989 | Japan . |
| 1553941 | 10/1979 | United Kingdom . |
| 1583996 | 2/1981 | United Kingdom . |
| 2150401 | 7/1985 | United Kingdom . |
| 2178631 | 2/1987 | United Kingdom . |

OTHER PUBLICATIONS

Scientist Corp., Second Collection, 1987, pp. 111–118, "Cultivation of Marine Products and Water".

Primary Examiner—Gene Mancene
Assistant Examiner—R. Thomas Rice
Attorney, Agent, or Firm—Oblon, Spivak, McClelland, Maier & Neustadt

[57] ABSTRACT

A breeding apparatus comprising a breeding water tank, an ozonizing device, an activated carbon device and a breeding water circulating device wherein breeding water of sea water or a mixture of sea water and plain water is circulated in series in these devices, and the ozonizing device is located at the upstream side of the activated carbon device with respect to the flow of the breeding water.

7 Claims, 6 Drawing Sheets

BREEDING APPARATUS

FIELD OF THE INVENTION

The present invention relates to a breeding apparatus. More particularly, the present invention relates to an apparatus for breeding or cultivating aquatic animals such as fish, shells or the like.

BACKGROUND OF THE ART

Activities of marine product industries have been restricted because of problems of environment contamination, overfishing and territorial waters. The catches of fish have become small and it has been difficult to keep fishing grounds.

In view of the above-mentioned problem, cultivation fishery has been spreaded. Namely, effective production of fishes and shells is planned by surrounding a part of a sea area such as a calm gulf, a lake or a river having good conditions with nets and by supplying foods and drugs. On the other hand, however, such cultivation fishery causes a problem of environment destruction. Namely, the waste of foods and excrement discharged by fishes accumulate on the bottom of the sea and contaminate the sea area.

In view of these problems, there has been practiced a method wherein cultivation fishery is conducted by supplying breeding water in a breeding tank installed on land. According to this method, the problem of environment contamination can be avoided by the installation of a waste water purification apparatus. Further, rational cultivation can be obtained by using various industrial operations.

In an attempt to further develop this idea, there has been noted a method of breeding fish or shells in a closed system. In the closed system, a highly powerful water purifying is needed wherein the amount of waste water can be reduced as much as possible by minimizing the replacement of breeding water. If the above-mentioned technique is practically used, the problem of environmental contamination can be eliminated and a stable supply of fresh marine products can be attained without creating a problem for land and other places. Further, the temperature of a breeding tank can be adjusted in an economical manner. Accordingly, the kinds of fish to be cultivated can be increased and production can be increased, whereby development of a new fishery can be expected.

There has been used a breeding water purifying apparatus in a closed breeding system wherein conventional technology of water treatment such as a sand filtering device is used. A breeding water purifying apparatus with a sterilization device is known. In this case, sterilization is conducted by using a chlorine-type reagent or ultraviolet rays or ozone (which are relatively new methods).

Figure 8:
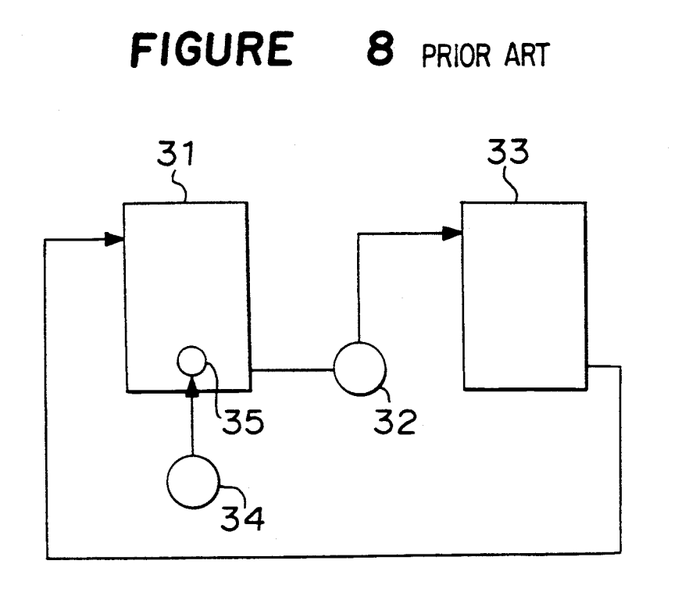
FIG. 8 is a block diagram showing a conventional breeding apparatus.

FIG. 8 is a diagram showing an embodiment of a conventional breeding apparatus used in an aquarium, which is disclosed in "Cultivation of Marine Products and water", Second collection (Scientice Corp., 1987, p 111). In FIG. 8, reference numeral 31 designates a breeding water tank, numeral 32 designates a circulating pump for breeding water, numeral 33 designates a sand filtering device, numeral 34 designates a blower and numeral 35 designates an air scattering device.

In FIG. 8, breeding water of reduced quality due to the excrement of fishes to be cultivated and foods left is supplied from the breeding water tank 31 to the sand filtering device 33 by means of the circulating pump 32. In the sand filtering device 33, the breeding water is purified by removing floating solids and by removing organic substances and contaminating components dissolved in water such as ammonical nitrogen by the action of microorganisms on the surface of sand. The purified breeding water is returned to the breeding water tank 31. The blower 34 is for supplying air which contains oxygen necessary for the existence and the growth of fish. Air supplied from the blower 34 is scattered in the breeding water by means of the air scattering device 35 to thereby supply oxygen in the breeding water. When substances difficult to purify increase in the breeding water and the quality of the breeding water becomes deteriorated so that it is unsuitable for the breeding, fresh water is supplied to the system, or the contaminated water is replaced by fresh water.

In the conventional breeding apparatus, sterilization by a chlorine-type reagent is usually conducted before the water is fed into the breeding water tank. As described before, ultraviolet rays or ozone may be used instead of a chlorine-type reagent.

In the conventional circulation type breeding apparatus with a purifying function as described above, there have been requirements wherein as great an amount of foods should be given to fishes so that high density cultivation be attained. However, a closed-type breeding apparatus capable of satisfying such requirements could not be practically used. The major reason resides in the problem of becoming with infected disease in the fish to be cultivated.

Namely, since the conventional breeding apparatus has no sterilization means as shown in FIG. 8, the fish are infected with disease when germs enter into the breeding water tank by any cause. Even though a chlorine-type reagent is used for sterilization to prevent the fish from becoming infected with disease, the reagent is apt to live in water and is toxic to the fish to be cultivated. Accordingly, there is a restriction as to the amount of administration, and it is sometimes difficult to obtain sufficient sterilization.

Sterilization by ultraviolet rays has an advantage of resulting in no residual toxicity. However, when the surface of an ultraviolet ray lamp is stained, the effect of sterilization is reduced because of the reduction of transmittance of the ultraviolet rays whereby the quality of breeding water becomes deteriorated. Accordingly, the use of ultraviolet rays has problems of reliability and the maintenance when a breeding apparatus is practically used.

Ozone the has advantages of high sterilizing effect and less residual property (decomposition into oxygen) in comparison with the chlorine-type reagent. Further, it has an oxidative destruction effect to contaminant components unlike the chlorine-type reagent. Accordingly, ozone has a desired nature of purification in a closed type breeding apparatus. However, when the breeding water contains sea water, ozone reacts with bromine ions existing in the sea water whereby residual oxidizing products having toxicity is produced. As a result, the same problem as the chlorine-type reagent arises.

In studying the entirety of the above-mentioned problems, the sterilization and purification functions obtained by ozone in the closed-type breeding apparatus is still attractive, and if the problem of the residual oxidizing product in the case where sea water is used for breeding water is dissolved, the possibility of realizing a closed type breeding system can be increased. Even though the residual oxidizing product can be easily removed by the addition of reducing agent, it is not practical from the viewpoint of stability and maintenance.

SUMMARY OF THE INVENTION

It is an object of the present invention to provide a breeding apparatus of a closed system capable of breeding fish such as young fishes and which is capable of removing pathogenic microbes and suppressing the breeding of the microbes while removing residual oxidizing product having a, sterilization effect which is produced when ozone is use.

In accordance with the present invention, there is provided a breeding apparatus comprising a breeding water tank, an ozonizing device, an activated carbon device and a breeding water circulating device wherein breeding water of sea water consisting or a mixture of sea water and plain water is circulated in series in these devices, and the ozonizing device is located at the upstream side of the activated carbon device with respect to the flow of the breeding water.

The present invention has been attained by utilizing a new finding obtained through extensive study on the treatment with activated carbon of ozone-treated sea water, and experiments of breeding young fish in a closed system, wherein effectiveness in the combination of the ozone treatment and the activated carbon treatment is found in the closed breeding system, while the above-mentioned disadvantage of the ozone treatment is removed. Namely, as described in a paper (W. R. Haag and J. Hoigne, Ozone: Science and Engineering, vol. 6, pp. 103–114, 1984), there has been a general view that hypobromous acid ions and bromic acid ions are produced by the reaction of ozone with bromine ions contained in sea water (about 60 mg/l in natural sea water) although these ions function as a sterilizing agent, that they have toxicity to fishes and the toxicity is apt to remain in the sea water. Accordingly, ozone could not be used to sterilize or purify breeding water when it contains sea water, as described above.

However, the inventors of the present patent application have known that the oxidizing product produced by the ozone treatment of sea water is different from the oxidizing product which has conventionally been thought. Namely, although the oxidizing product produced by the ozone treatment of the sea water, could easily be removed by contacting the product with activated carbon, the removing capability of the activated carbon to hypobromous acid ions and bromic acid ions as a reagent was very low. For instance, in comparing the removal rate of oxidizing products produced when sea water was subjected to an ozone treatment, or bromine water or aqueous potassium bromate solution (as a reagent) was treated with activated carbon under the condition that the spatial velocity SV was $50 \, hr^{-1}$, they respectively indicated 100%, 4% and 8%. This finding overturned common knowledge, and it has an important meaning which will now be described. Namely, it indicates that the oxidizing product obtained by treating sea water with ozone is very active and this product has an effective function if an appropriate amount of ozone is used for sterilization and purification, and if an appropriate reaction time is maintained. Further, the fact that the product can be easily removed by the contact of the activated carbon implies that it is enough to use an activated carbon device having a small capacity. As a more important fact, it was found that the oxidizing product was not removed by the absorption to the activated carbon, but it was removed through a chemical reaction which returns to bromic ions. This suggests that the activated carbon is not merely an absorbing agent but it functions as a catalyst. Accordingly, the service life of the activated carbon can be prolonged. Further, there is no consumption of bromic ions, and therefore the removal of the oxidizing product can be easily and stably carried out.

By employing such newly found fact, breeding water is first subjected to purification and sterilization with ozone; a residual oxidizing product is removed with a small amount of activated carbon, and the thus treated breeding water is returned to a breeding water tank, whereby the problem of the residual oxidizing product can be easily eliminated. Further, even when the sterilization agent is removed by the above-mentioned method, an infections disease to fish to be bred in a closed system can be avoided and it is possible to stably maintained the quality of breeding water for breeding fish without the necessity of replacement of the breeding water.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Several embodiments of the breeding apparatus of the present invention will now be described.

Figure 1:
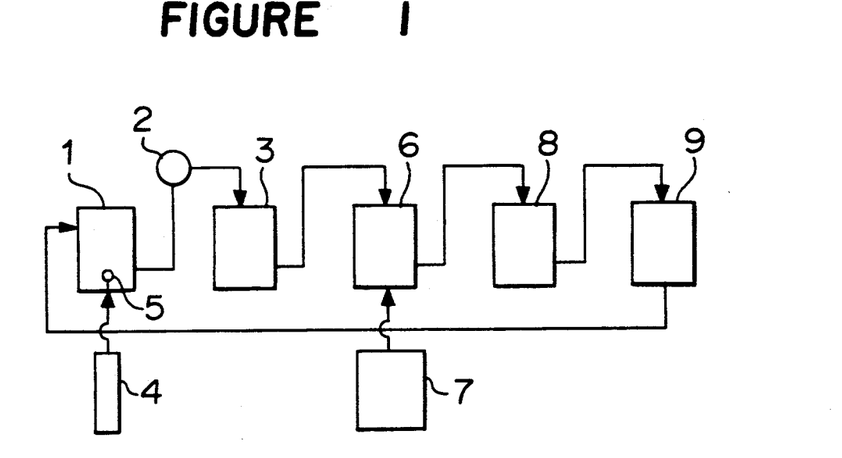
FIG. 1 is a block diagram showing an embodiment of the breeding apparatus according to the present invention.

FIG. 1 is a diagram showing a flow of breeding water in the breeding apparatus according the first embodiment of the present invention. In FIG. 1, reference numeral 1 designates a breeding water tank, numeral 2 designates a circulating pump, a numeral 3 designates a filtering device, numeral 4 designates a blower, a numeral 5 designates an air scattering device, a numeral 6 designates an ozone reaction device and a numeral 7 designates an ozone generating device. The ozone reaction device 6 and the ozone generating device 7 constitute an ozone treating device. A numeral 8 designates an activating carbon device and a numeral 9 designates a pH adjusting device. The filtering device 3 preferably has a function of removing solid substances and a function of removing ammoniacal nitrogen by using biotechnology. A sand filtering method is usually used because it is economical and practical.

The function of the breeding apparatus as shown in FIG. 1 will be described. Breeding water contaminated with metabolic materials and excrement from fishes in the breeding water tank 1 is transferred to the filtering device 3 by means of the circulating pump 2, and floating solid components are removed at the same time when organic materials and soluble contamination components such as ammoniacal nitrogen are remove by using biotechnology in the filtering device 3. The breeding water treated in the filtering device 3 is fed into the ozone reaction device 6 where the water is brought into contact with ozone-containing gas supplied from the ozone generating device 7 so that it is sterilized and at the same time, a part of the contamination components undergoes an oxidizing treatment. When sea water is used for the breeding water, and oxidizing product is produced in the ozone treatment as described before. The amount of ozone to be supplied is determined with consideration of the degree of contamination and the ability of biological treatment which depends on the breeding density, the stage of breeding, the amount of breeding food and so on. The breeding water is gradually sterilized and purified while the water flows through the ozone reaction device 6 and pipes which allows an appropriate time period for stagnation. When the breeding water enters into the activated carbon device 8, most residual oxidizing products are certainly and stably removed, and the same time, a part of the contamination material is removed. Accordingly, even though the amount of ozone to be supplied is excessive, there is no danger of leakage of the oxidizing product so that no problems are caused in the breeding of fish. The oxidizing product is returned to bromic ions. The amount of the activated carbon used in this embodiment may be smaller than the amount used in ordinarily water treatment. After the sterilization reagent is removed, the breeding water which has been passed though the activated carbon device is fed to the pH adjusting device 9 where adjustment of pH is conducted, and the breeding water is returned to the breeding water tank 1. Thus, the above-mentioned water treatment is repeatedly conducted.

Usually, ozone is continuously supplied to the breeding water. However, the supply may be intermittently conducted depending on the degree of contamination which also depends on a stage of the growth of fish and an amount of breeding food. For the filtering device 3 or a filtering material such as sand, anthracite is preferably used. However, another filtering material may be used in combination with a biological treatment.

The breeding water tank 1 is preferably of a simple structure such that it has a cover for preventing bacteria from entering in it; provides a suitable optical condition (intensity) for illumination for controlling an increase of algae and has an inner portion for preventing the deposition of living organism by which the effect of this embodiment of the invention can be enhanced.

Next, an experiment and the result of breeding will be described.

For experiments in breeding, red sea breams, croakers and flatfish which are just past incubation are used. They are respectively put in each flow system according to the present invention: a flow system in which only treatment by ozone is omitted and another flow system in which only treatment by activated carbon is omitted.

In the flow system without using activated carbon, an oxidizing product was detected in the breeding water after several hours in an amount measurable through iodometry and the frys were completely destroyed. From this, it was found that breeding was impossible in the closed type circulation system even when an accumulating amount of the oxidizing product was an extremely low level. Results of a comparison in the flow system according to the present invention and the flow system in which only ozone treatment was omitted were as follows. In the conditions of experiments, frys after the incubation were put in a 300 l breeding water tank. The volume of activated carbon was 10 l;, the feeding rate of breeding water as 6 l/min, and there was not a replacement of fresh sea water during the experiments. In the flow system of the present invention, ozone is continuously injected at a rate of about 10 g per day per cubic meter of the breeding water and the stagnation time of breeding water during the reaction of ozone was 2 minutes.

The oxidizing product produced by the ozone was completely removed by a smaller amount of activated carbon than the amount used for the ordinally water treatment. Further, the ability of removal of the oxidizing product could be maintained for a long time. In view of the fact that the bromic ion concentration in the circulating breeding water was not substantially changed from about 50 mg/l as an initial value, the mechanism of the removal of the oxidizing product by the activated carbon is not by adsorption but rather by reduction to bromic ions though the catalytic activity of the activated carbon. Thus, even by a smaller amount of the activated carbon a, sufficiently effective and stable removal effect can be maintained for a long time. In experiments using red sea breams, they had a body length of about 11 cm after 75 days. During the experiments, they well grew and had an excellent appetite. During the breeding period, there were no fish infected with typical pathogenic microbes and diseases. On the other hand, in the flow system without using the ozone treatment, infection by inflammation of intestines after 35 days was found. The yield per volume of breeding water tank during 75 breeding days was 2,700 heads/$m^3$ in the flow system according to the present invention. On the other hand, the yield in the flow system without using the ozone treatment was as half that of present invention, specifically, 1,000 heads/$m^3$.

The quality of breeding water in the breeding water tank was kept excellent during the breeding period. The effect of the ozone was particularly remarkable in such characteristics of items on water quality as chromaticity, SS, and accumulations in the breeding water. There was found a great difference in transparency of the breeding water in the tank in comparison with that in the flow system without using the ozone treatment. Undesirable deposition of livings and algae on the wall of the water tank could be substantially controlled. There was no substantial difference as to the the concentration of the organic materials, e.g. COD, TOC. It should be note that the entire circulation system is purified as described above even though the residual oxidizing product is removed and there is no infections of the fish. This is because the microbe count is of a low level even when the residual sterilization reagent concentration in the water tank is lower than a critical point of detection and it is so low that it does not cause problems for breeding. Thus, it is possible to control diseases infecting the fish.

In the above-mentioned embodiment, the filtering device may be a simple one such as a filter in the case where the degree of contamination of breeding water is small. Further, the pH adjusting device may be omitted.

Thus, in the above-mentioned embodiment, ozone having excellent characteristics of sterilization and purification of the breeding water in a closed breeding system is used. By utilizing the characteristics of the ozone, there is obtainable a high yield without replacing the breeding water even when a mixture of sea water and plain water is used for the breeding water. Further, infection of the fishes can be controlled and maintenance can be made easy to perform.

Another embodiment of the present invention will now be described. This embodiment concerns a closed type breeding apparatus using ozone wherein decomposition of ammoniacal nitrogen is stably effected and accumulation of nitrogen components can be prevented.

In a closed type breeding apparatus, there was often found that a biological treatment became out of order in actual breeding and the concentration of ammoniacal nitrogen became high. Ammoniacal nitrogen has a strong toxicity to fishes. When the concentration is slightly increased, they are easily stimulated and show an extreme reduction of appetite. When the concentration exceeds a limit, they are completely destroyed. Although such problem can be avoided by severely controlling biological treatment, it is practically difficult to obtain a precise control because a change of contamination is large under breeding conditions.

The inventors of this application have found that ammonia is easily decomposed to nitrogen molecules if an ozone treatment satisfies predetermined conditions in a purification flow system wherein an activated carbon treatment is conducted after an ozone treatment. It is known that when sea water is treated with ozone, an oxidizing product remains although ozone is decomposed quickly. It has been common knowledge that hypobromous acid ions and bromic acid ions are produced by the reaction of bromine ions contained in sea water (i.e. about 60 mg/l in natural sea water) with ozone. However, the inventors have found that the reaction product is a material belonging to another chemical species. As a result of various studies, it was found that when sea water containing ammonia was subjected to an ozone treatment and thereafter to an activated carbon treatment, the ammonia was apparently changed to nitrogen molecules. This mechanism can be indicated as:

Namely,

In the above-mentioned formulas, bromic ions do not apparently take part, and accordingly, there is no consumption. When the amount of the oxidizing product is less than amount of ammonia, the ammonia is reproduced in the above-mentioned process. Accordingly, an ozone injection quantity is an importance factor.

In this embodiment of the present invention, an ammoniacal nitrogen concentration in breeding water to be circulated is measured, and the concentration of ozone to be supplied to the breeding water is controlled so that it is at least 5 times as high as the ammoniacal nitrogen concentration in the breeding water, whereby ammonia can be easily decomposed to nitrogen molecules.

Figure 2:
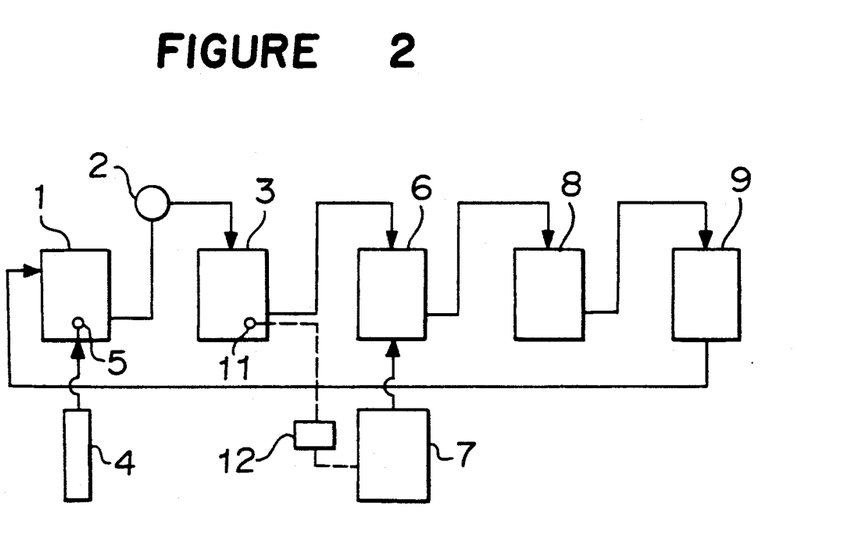
FIG. 2 is a block diagram showing another embodiment of the breeding apparatus according to the present invention.

Another embodiment of the breeding apparatus constructed in accordance with the present invention will be described with reference to FIG. 2. In FIG. 2, the same reference numerals as in FIG. 1 designate the same or corresponding parts, and therefore, description of these parts is omitted. Reference numeral 11 designates an ammonia concentration sensor and a numeral 12 designates a control device.

Breeding water contaminated with metabolic materials and excrement of fishes in the breeding water tank 1 is transferred to the filtering device 3 by means of the circulating pump 2, where floating solid components are removed and soluble organic materials deposited on the carriers of the filtering device are purified by microorganisms. In this embodiment, the filtering device 3 may not have an ammonia removing function although ammonia can be removed by forming an anaerobic environment in a filtering layer depending on operational condition for the filtering device 3. However, if the filtering device 3 has such function, it is possible to reduce an ozone consumption rate in an ozone treatment, which will be described after.

The breeding water is fed into the ozone reaction device 6 where the water is reduced with part of ozone so as to effect the removal of ammonia, sterilization and the removal of organic materials. In this case, when an amount of oxidizing product produced in the ozone reaction device 6 is less than an amount of existing ammonia, ammonia is reproduced. Accordingly, an amount of ozone generated from the ozone generating device 7 is an important factor.

Figure 3A:
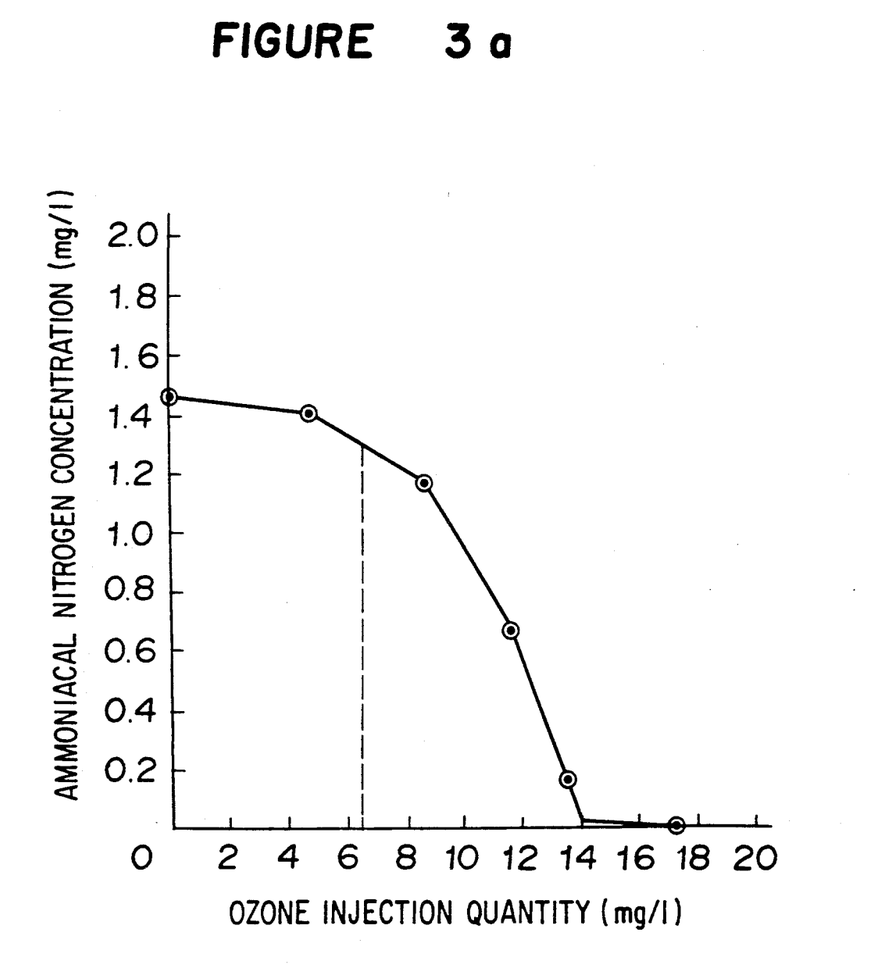
FIGS. 3a and 3b are respectively characteristic diagrams showing the relations between an amount of ozone fed to sea water to an ammonical nitrogen concentration remaining in the sea water.
Figure 3B:
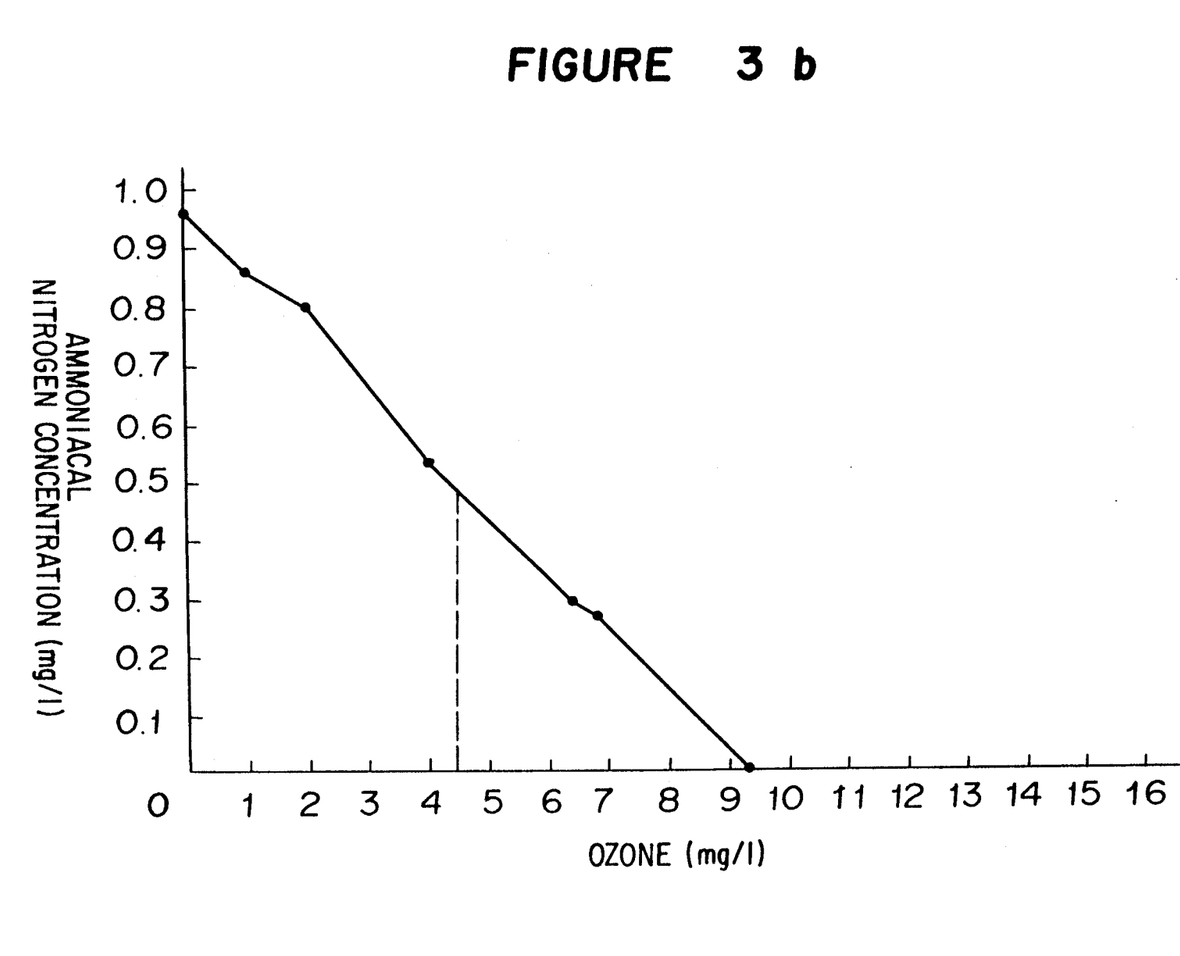

FIGS. 3a and 3b are respectively characteristic diagrams showing the relations of an ozone injection quantity per a unit volume of sea water to an ammoniacal nitrogen concentration. From the Figures, it was found that the reproduction of ammonia can be controlled by incorporating ozone at an ozone concentration of at least 5 times, preferably 10 times as high as an ammoniacal nitrogen concentration before an ozone treatment. Practically, an amount of ozone generated from the ozone generating device 7 is operated in the control device 12 so that it is 5 times amount (effective value) or more of an ammoniacal nitrogen quantity, the operation being based on an ammonia concentration in breeding water circulated, which is detected by the ammonia concentration sensor 11. The instruction of the control device 12 is given to the ozone generating device 7, and an amount of ozone supplied to the ozone reaction device 6 is determined.

The breeding water having been subjected to an ozone treatment contains a product which includes an oxidizing product. When the breeding water containing the oxidizing product is supplied to the breeding water tank, fish in the breeding water tank may be damaged. Accordingly, the breeding water is fed to the activated carbon device 8 with an appropriate stagnation time, and the toxic oxidizing product is removed, and at the same time, organic materials are partially removed. During the removal of the oxidizing product with activated carbon, bromic ions are reproduced. Accordingly, it is unnecessary to supply bromic ions in a closed circulation system. As described before, it should be noted that when an ozone injection quantity is short, ammonia is reproduced in the above-mentioned process and there is no nitrogen removal effect. The breeding water having been subjected to the activated carbon treatment is adjusted to have a predetermined pH in the pH adjusting device 9 and is returned to the breeding water tank 1.

In the practical breeding, and ammonia concentration should be maintained at a low level except for a special case. On the other hand, various substances which react with ozone exist in the breeding water, and it is important to remove these substances by ozone. Usually, ozone is added at an amount more than that required for denitrification. In view of the above-mentioned, such control is not always necessary for the ordinary water purifying operations. However, in consideration that an ammonia concentration may rapidly rise due to the overfeeding of food or an unsuitable biological treatment, the ammonia concentration sensor and the control device are provided so that a stable production can be obtained.

Experiments and a result of the breeding in the above-mentioned embodiment of the present invention will now be described. In this embodiment, a quick nitrogen removal effect could be obtained. The breeding of young red sea breams was experimentally conducted. When the supply of ozone was stopped, the ammonia concentration in the breeding water is increased for several hours, and stripe-like pattern appear on the body of the fish they became nervous and stopped to eat food after 10 hour. When the supply of ozone was restarted, the ammonia concentration was remarkably reduced after several hours and the above-mentioned phenomenon disappeared.

In the above-mentioned embodiment, the filtering device 3 is effective in reducing the ozone quantity but it is not essential to remove nitrogen in ammonia. Further, the pH adjusting device 9 is not an essential element although it is usually used for breeding fishes in a closed breeding system.

Figure 4:
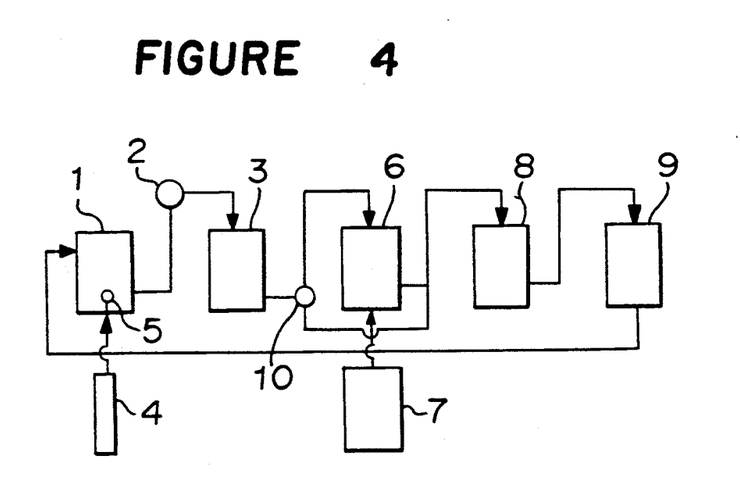
FIG. 4 is a block diagram showing another embodiment of the breeding apparatus according to the present invention.

FIG. 4 is a diagram showing another embodiment of the breeding apparatus according to the present invention. In FIG. 4, the same reference numerals as in FIG. 2 designate the same or corresponding parts, and therefore description of these parts is omitted. Reference numeral 10 designates a branch valve.

In operation, the breeding the water fed from the breeding water tank 1 through the filtering device 3 is introduced in the branch valve 10 at which the breeding water is divided into a portion supplied to the ozone reaction device 6 and a portion introduced to a pipe which bypasses the ozone reaction device 6. The first portion of the breeding water reacts with a predetermined amount of ozone in the ozone reaction device 6 so that the removal of nitrogen from ammonia, sterilization and the removal of organic materials are effected. In the breeding water which has been subjected to an ozone there is contained an oxidizing product formed by the reaction of ozone with bromic ions in sea water. The ozone-treated breeding water is mixed with the breeding water which is directly supplied from the filtering device, and the mixture is introduced into the activated carbon device 8 with an appropriate stagnation time, during which the entire amount of breeding water circulated in the closed system is sterilized by the action of the oxidizing product remaining in the ozone-treated breeding water. When the stagnation time is short, a stagnation tank should be provided. The proportion of breeding water divided at the branch valve is determined with consideration of an ozone consumption quantity and the ammoniacal nitrogen concentration. Namely, the branch valve 10 is controlled so that the amount of breeding water M to be divided at the branch valve 10 and to be supplied to the ozone treating device satisfies the relationship: ammoniacal nitrogen concentration $\times M \leqq$ ozone consumption quantity $\div 5$. For instance, when an amount of ozone which is greater than an amount exceeding the capacity of the ozone generating device is required, an amount of the breeding water to be fed to the ozone reaction device is reduced so as to satisfy the above-mentioned conduction and an amount of food to be supplied to the fish is temporarily reduce. These operations are performed by the control device in cooperation with an ammonia concentration sensor (not shown).

In the above-mentioned embodiment, ozone is used in a closed-type breeding system, the ammonia concentration in the breeding water can be easily adjusted to a low concentration without using a biological treatment and a complicated administration, whereby stable breeding can be attained. Further, a rise in ammonia concentration for any reason can be quickly reduced if the capacity of the ozone generating device is large.

Another embodiment of the breeding apparatus in a closed system of the present invention will now be described. The embodiment of the present invention series to overcome the following problem which sometimes occurs in a conventional circulation type breeding apparatus. Namely, in the conventional circulation type breeding apparatus, there was found that a biological treatment was not always well operated whereby the quantity of breeding water rapidly deteriorated to thereby cause difficulty in breeding. Further, when the degree of contamination in the breeding water increased by feeding too much food to the fish, biological functioning could not often be attained. As a result, the breeding of fishes could not often be obtained effectively in a stable manner.

The inventors of the present application have made extensive studies on the purification of breeding water in a closed circulation type breeding apparatus, and then reached the following conclusions.

For breeding water, the following conditions have to be satisfied:

(1) there are no pathogenic microorganisms, (2) toxic substances have to be suppressed in a permissible concentration level or lower, and (3) the water quality index represented by BOD or COD, in an overall view, does not adversely affect the fishes.

Among items (1), (2) and (3) items (2) and (3) have a supplementary relation. For instance, when item (2) is sufficiently satisfied, item (3) is permitted to exist even when it is more or less poor. On the contrary, when the item (2) is not sufficiently satisfied, the condition of item (3) is severely considered.

Item (2), ammonia discharged by the object of the breeding, i.e. fish, creates a problem in a closed type breeding apparatus. Ammonia has a strong toxicity to fish. According to experiments by the inventors of this application, young red sea breams two-three months after the incubation, shown a reaction to stimulation and an extreme reduction of appetite even when the ammonia concentration in the breeding water is about 1.0 mg/l. The frys of read sea bream show a similar attitude even when the concentration is about 0.5 mg/1 or less. In an ordinary purifying apparatus, ammonia or BOD is removed by a biological treatment wherein it is carried out by using anaerobic and aerobic microorganisms. Accordingly, it seems to be difficult to maintain a balanced state from the above-mentioned point of view in a breeding apparatus in which breeding water is circulated in an aerobic condition.

The inventors thought it to be reasonable that items (2) and (3) are respectively treated in separate stages while item (1) is realized. Especially, items (2) and (3) should be conducted by using physical chemistry. In order to realize such an idea, an ozone treatment, an ozone treatment plus air bubble separation, and an ozone treatment and an activated carbon treatment were systematically combined. The function of the systematical combination is described below.

When the amount of ozone is increased in breeding water which is contaminated with organic materials, air bubbles are easily produced in the breeding water. Then, the breeding water is exposed to air to thereby produce bubbles. Thus, organic substances which cause contamination of water can be effectively removed by discharging the thus obtained stable bubbles out of the system. When the ozone injection quantity becomes high, there is caused a problem of residual ozone and a high concentration of oxidizing product, which adversely influences the fish if the breeding water containing the residual ozone and oxidizing product is returned to the breeding water tank. However, they can be easily removed through an activated carbon treatment. Namely, when the breeding water contains bromic ions, they react with ozone to produce an oxidizing product. The concentration of the oxidizing product is in a predetermined value or higher than the concentration of ammonia which is also contained in the breeding water and, the ammoniacal nitrogen is changed to nitrogen molecules. In order to form such an environment, a surplus amount of the oxidizing product is usually produced. However, it can be easily removed by the activated carbon treatment. Ozone functions as a sterilization reagent.

In the case where an air expansion rate is different at the inlet and the outlet of each of the devices in the circulating purification system, and independent bubble separation device may be provided for exposure at a suitable position so that organic materials can further be removed effectively.

Although the ozone performs an important function, it is effective to provide a filtering device capable of treating biologically if an amount of ozone becomes excessive. Thus, the ozone effects the removal of organic material, denitrification and sterilization, and the disadvantage caused by the ozone can be easily eliminated by using an activated carbon treatment.

Figure 5:
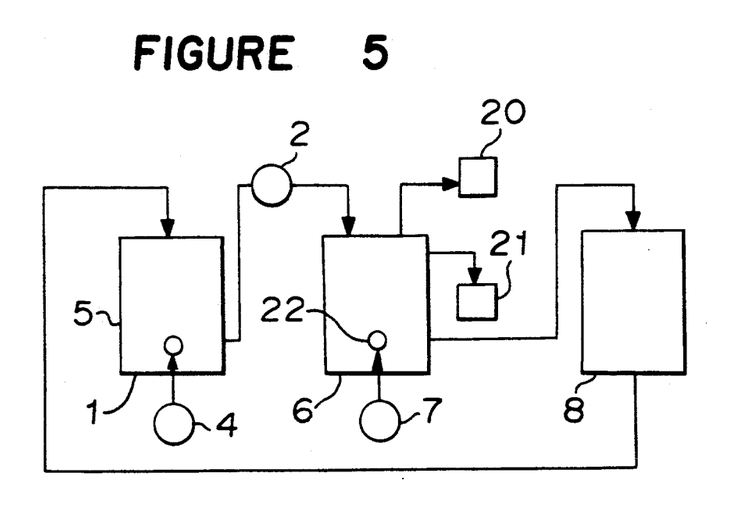
FIG. 5 is a block diagram showing another embodiment of the breeding apparatus according to the present invention.

Another embodiment of the breeding apparatus of the present invention will now be described with reference to FIG. 5 which shows a flow system of the breeding apparatus. In FIG. 5, the same reference numerals as used in FIG. 1 designate the same or corresponding parts, and description of these parts is omitted.

Reference numeral 20 designates a waste ozone treating device, numeral 21 designates a bubble receiving tank and numeral 22 designates an air scattering device.

In operation, breeding water in the breeding water tank 1 is introduced into the ozone reaction device 6 by means of the circulating pump 2. The breeding water is brought into contact with bubbles minimized by the air scattering device 22 which supplies ozone-containing gas from the ozone generating device 7 so that the breeding water undergoes sterilization, and contamination components in the water are oxidized and purified. There are some kinds of contamination components wherein the structure of the molecules of contamination components is changed by the reaction with ozone. An excessive amount of ozone in a gaseous phase in the ozone reaction device is decomposed in the waste ozone decomposing device 20 and discharged in air. Thus, an excessive amount of ozone usually remains in the breeding water treated with ozone. When sea water or water including the sea water is used for the breeding water, bromic ions in the sea water react with ozone and an oxidizing product as a reaction product is left in the breeding water. The oxidizing product has a strong toxicity to fish. The ozone-treated breeding water is introduced into the activated carbon device where the ozone and the oxidizing product are removed and at the same time, part of the contamination components are also removed. Then, the breeding water is fed to a pH adjusting device (not shown) and the breeding water tank. Thus, the breeding water is circulated in the system. During circulation of the of breeding water, the oxidizing product can be effectively removed by an activated carbon treatment.

When the breeding water is circulated in the system, the amount of ozone gradually increases in the breeding water, whereby the breeding water produces bubbles. In a breeding apparatus operated under normal conditions, such state appears several hours after the supply of food. In this state, bubbles are formed in the upper space of the ozone reaction device 6 as an air bubble tower. Bubbles in an upper space contain organic contamination components at a high concentration. The organic contamination components are fed to the bubble receiving tank 21 to destroy bubbles. Then, gas produced by breading the bubbles are discharged out the system. When an excessive amount of ozone is produced in the bubble receiving tank 21, the waste ozone decomposition device 20 is connected to the ozone reaction device 6 to discharge ozone in gaseous phase produced after the breaking of bubbles.

When sea water or water containing sea water is used for the breeding water, a further advantage is obtainable by combining the above-mentioned ozone removing technique with a denitrification technique which is attained by the combination of an ozone treatment and an activated carbon treatment. Namely, a nitrogen removal effect is obtainable when an ozone injection quantity with respect to an amount of the breeding water satisfies predetermined conditions, and the ammonia concentration in the breeding water can be maintained at a low level whereby the appetite of the fish increases and the amount of food can be increased even when the concentration of organic materials is high. As a result, the existence of organic materials at a higher concentration is possible. Further, a bubble generating function increases in the breeding water and bubble separating operation can be eassy. Thus, the ozone treatment is advantageous for both the removal of nitrogen and the ease of bubbling, whereby cultivation of fish can easily occur without replacing breeding water.

Experiments with breeding were conducted by using a 300 l breeding water tank in which 50 red sea breams having a body length of about 10 cm are put. The experiments revealed that the survival rate was 100% for 60 days. Substantially no microorganisms were observed on the surface of the activated carbon. Accordingly, it was proved that the water quantity necessary for breeding was maintained without biological treatment.

Figure 6:
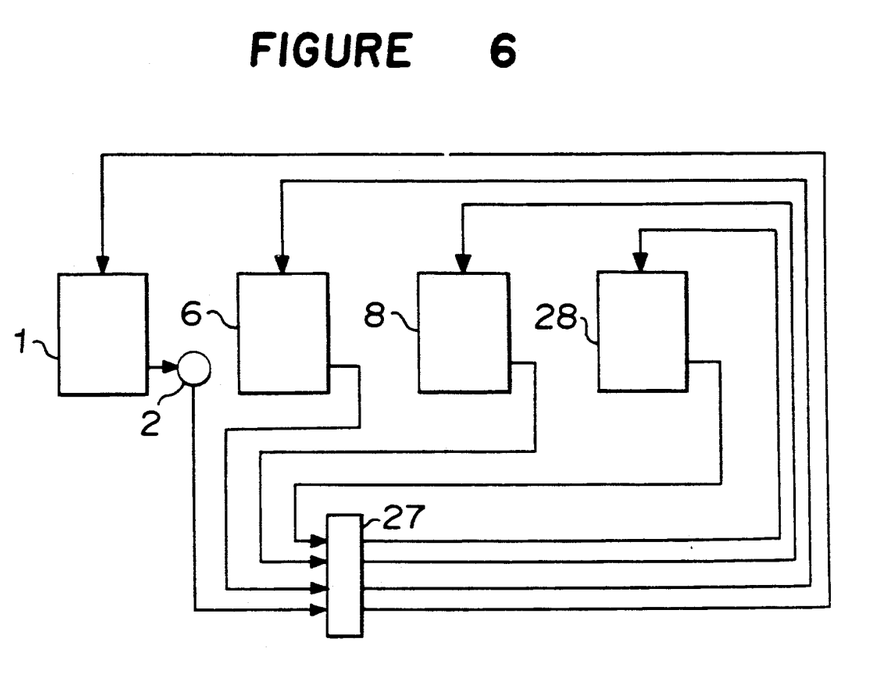
FIGS. 6 and 7 are respectively block diagrams showing other embodiments of the present invention.

FIG. 6 is a diagram showing another embodiment of the breeding apparatus of the present invention. In FIG. 6, the same reference numerals as used in FIG. 5 designate the same or corresponding parts. Reference numeral 27 designates a branch control device. The operation of the embodiment as shown in FIG. 6 is similar to that of FIG. 5. In this particular embodiment, a sequential order of a breeding water tank, a bubble separating treatment, an ozone treatment and an activated carbon treatment can be changed as desired. A bubbling tower is practically used for the bubble separating device 28 which controls the amount of bubbles by adjusting the air supplied. Thus, bubble separating can be effected at a location where bubbles are easily produced. Further, the amount to air supplied can be properly determined to produce a suitable amount of bubbles. Therefore, there is further obtainable an advantage of bubble separation.

Figure 7:
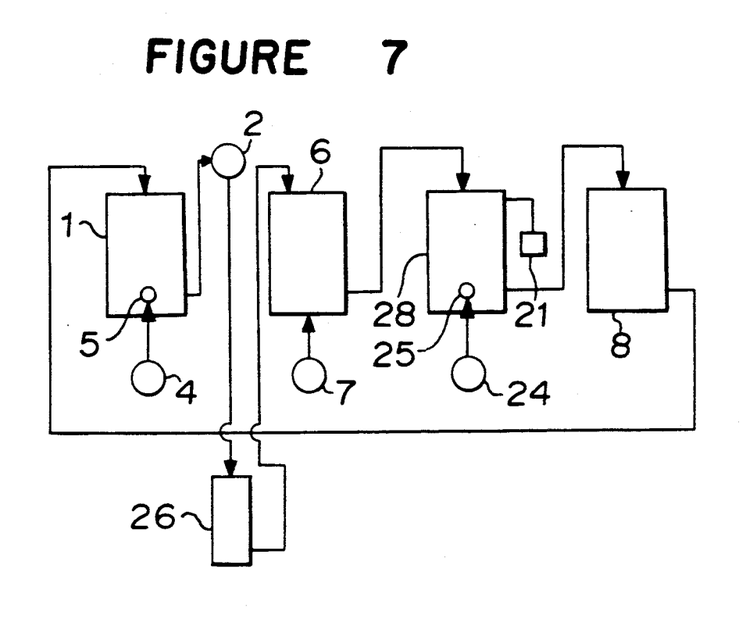

FIG. 7 is a diagram showing another embodiment of the breeding apparatus according to the present invention. In FIG. 7, the same reference numerals as appear in FIG. 6 designate the same or corresponding parts. Numeral 24 designates blower, a numeral 25 designates an air scattering device and numeral 26 designates a sand filtering device. The operation of this embodiment is similar that of FIG. 6.

The embodiments as shown FIGS. 6 and 7 do not include a filtering treatment and biological treatment. When these treatments are employed, an ozone consumption rate can be reduced. However, if the biological treatment is eliminated or the biological treatment does not function well, the effect of this embodiment can be covered by an ozone treatment and bubble separating treatment.

In the embodiment as shown in FIG. 7, a single bubble receiving tank 21 is provided. However, the breeding water may be supplied to the bubble separating device 28 from a plurality of locations in the circulation system. Further, an additional bubble separating device may be provided in the case where the air expansion property is different between the inlet and the outlet of each of the devices in the circulation system, whereby the removal effect of organic materials can be further increased.

Thus, in the embodiments shown in FIGS. 5 through 7, the amount of ozone to be supplied can be suitably determined; the air expansion property in the breeding water can be increased, and the replacement of fresh breeding water is unnecessary by using a bubble separating treatment without a biological treatment. Accordingly, it is possible to cultivate fishes with a high yield and a stable manner.

Further, breeding water can be supplied to the bubble separating device from a plurality of locations in the circulation system, whereby the removing effect of organic materials is increased.

Further, by adding a filtering treatment and a biological treatment, the ozone consumption rate can be reduced without causing a reduction in the entire functioning of the system.

We claim:

1. A breeding apparatus which comprises:
   a breeding water tank,
   an ozonizing device in communication with said tank downstream thereof,
   an activated carbon device in communication with said ozoning device downstream thereof, and
   a breeding water circulation device which includes means for circulating breeding water in series between each of said devices, wherein the ozonizing device is located upstream of the activated carbon device with respect to the flow of the breeding water.

2. The breeding apparatus according to claim 1, which comprises means for controlling the concentration of ozone to be added in the circulating breeding water which is ozonized in the ozonizing device so as to be at least 5 times as high in ammoniacal nitrogen concentration as that in the circulated breeding water.

3. The breeding apparatus according to claim 2, which comprises means for dividing the circulated breeding water flowing from the breeding water tank into first and second parts wherein the first part is fed to the ozonizing device and the second part bypasses the ozonizing device; and means for mixing the first part of the breeding water, after having been subjected to ozonization, with the second part of the breeding water so as to form a mixture, and means for feeding the mixture to the activated carbon device, wherein an amount M of the breeding water to be fed to the ozonizing device is controlled so as to satisfy the relationship: ammoniacal nitrogen concentration $\times$ M $\leq$ ozone consumption $\div$ 5.

4. The breeding apparatus according to claim 1, which comprises a bubble separating device located in the circulation path of the breeding water.

5. The breeding apparatus according to claim 4, wherein the bubble separating device is located in the ozonizing device and comprises an ozone treating bubble tower.

6. The breeding apparatus according to claim 4, which comprises means for feeding breeding water treated in the bubble separating device at a plurality of locations in the circulation path.

7. The breeding apparatus according to claim 4, which comprises a sand filtering device located in the circulation path.

* * * * *